Feb. 24, 1970  K. L. JOHNSON  3,496,582
METHOD OF MAKING PREVAILING TORQUE LOCKNUTS
Original Filed Nov. 6, 1964

INVENTOR
KENNETH L. JOHNSON

BY Green, McCallister & Miller

HIS ATTORNEYS

# United States Patent Office 3,496,582
Patented Feb. 24, 1970

3,496,582
METHOD OF MAKING PREVAILING TORQUE LOCKNUTS
Kenneth L. Johnson, 1206 Leslie Drive, Pitcairn, Pa. 15140
Original application Nov. 6, 1964, Ser. No. 409,391, now Patent No. 3,340,920, dated Sept. 12, 1967. Divided and this application July 12, 1967, Ser. No. 652,816
Int. Cl. B21d 53/20
U.S. Cl. 10—86       7 Claims

ABSTRACT OF THE DISCLOSURE

A prevailing torque fastener or lock nut of polygonal or hexagonal symmetrical outer shape is made by starting with a nut body of asymmetrical or oblong shape in the sense of having a greater dimension along one lateral axis and of lesser dimension along a second lateral axis at right angles to the first axis, that has a symmetrical or circular threaded bore extending centrally therethrough, that has a greater wall thickness between its exterior surface and its threaded bore along the first axis than along the second axis, and that has an upper end area that is to be distorted. In finally forming the fastener or nut, a forming tool having a conical symmetrical shape or cavity is applied axially of the threaded bore downwardly upon two opposed corner areas at the one or upper end of the preliminary body. The opposed corner areas of the preliminary body are provided with a pair of opposed force application surfaces that have a radial inward upward slope towards the threaded bore and contiguous with the top end face of the body and that lie on the first lateral axis. The tool then forms the nut body into one that is exteriorly symmetrical about the central axis of its side walls and is symmetric at the top or one end thereof to which the deforming force is applied. The portion of the threaded bore extending from the upper end of the nut and its top face is distorted inwardly into an asymmetrical shape and defines a smooth connection with the lower portion of the threaded bore which retains its cylindircal or symmetrical shape. The application of the force by the tool, as applied to the opposite force application surfaces of the nut body, is directed downwardly and radially-inwardly from such surfaces to make the upper end portion of the threaded bore oval in configuration and, at the same time, make the exterior of the body of symmetrical shape such that it may accept a standard wrench.

This is a division of application Ser. No. 409,391, filed Nov. 6, 1964, entitled "Prevailing Torque Lock Nut" now U.S. Patent No. 3,340,920, Sept. 12, 1967.

This invention relates to fasteners in the nature of lock nuts and particularly to prevailing torque nuts and a method of making them.

My improved prevailing torque lock nut is characterized by its ability to acept a full range of tolerance variations with a low initial torque, and more than adequate reusability—the standard industrial indicia of lock nut performance.

It is the function of a lock nut to grip the threaded shank of a cooperating bolt with sufficient force to resist the relatively small forces that tend to cause backing off or loosening of the nut. These forces result from vibration and other dynamic loadings that tend to temporarily relieve some of the axial load on the nut and small rotational or non-axial loads or displacements of the parts connected by the nut and bolt. The holding force required is relatively small as seen from the current industrial standards which, for example, pass lock nuts of a ⅜-16 thread having an application (or holding) torque of only 8½ inch pounds after five separate applications.

Lock nuts generally employ a deformed thread (radially, axially or both) that causes an interference or metalmoving fit with the threads of a cooperating bolt. Those skilled in the art appreciate that the development of holding torque by any adequate deformation is not a difficult task.

Quality in a lock nut thus is not measured by its ability to develop holding torque, except as to minimum standards, but is determined by more subtle and difficult to obtain ancillary characteristics.

Lock nuts employed on an assembly line ideally should be capable of adequate performance throughtout a wide range of tolerance variations. For example, a nut with maximum tolerance bore must develop adequate holding torque when applied to a bolt having a minimum tolerance shank and a nut having a minimum tolerance bore must be useable with a bolt of maximum tolerance shank. It is well known that the wider the tolerance range, the cheaper the overall cost.

On assembly lines, pre-set powered torque wrenches are employed to apply lock nuts and the holding torque developed in extreme tolerance situations is particularly important. The lock nuts are tightened to the predetermined torque which results from a combination of holding torque developed by the nut on the bolt, and tightening torque developed by the gripping action of the nut and bolt on the part held thereby. The variation in holding torque due to tolerance variations results in the development of more or less gripping force—the ultimate object of the fastener in the first place.

Another measure of quality in a lock nut is its ability to develop adequate holding torque after repeated applications. Repeated applications of a lock nut tend to destroy the set deformation of the nut bore and also wear away the nut threads. Although actual reuse of lock nuts is fairly uncommon, this measure of quality indicates the behavior capablity of a lock nut under a wide range of situations such as use on a long bolt requiring traversal of a long thread length. Along with specifications as to the minimum holding torque developed after five standard applications, the industry specifies, for example, that the initial torque required for application of ⅜-16 nut shall not be more than 80 inch pounds. It is thus necessary for a lock nut to retain at least one-tenth of its initial holding torque after five applications. Surprisingly enough this is a difficult standard to meet.

A further measure of quality in a lock nut is its ability to perform adequately while requiring as low an initial torque as possible. Low initial torque is somewhat related to the factors discussed above. In addition to those factors, it is desirable for the prevention of thread damage as caused by excess wear and seizing due to excessive frictional forces inherent in an initial torque or holding torque.

It has thus been an object of this invention to fully investigate the industrial need for quality features in a prevailing torque lock nut;

Another object of this invention has been to devise a method of making a lock nut capable of performing adequately throughout a wide range of tolerance variations;

Another important object of this invention has been to device a method of making a lock nut having a comparatively low initial torque but meeting all of the accepted industrial specifications;

A further object of this invention has been to devise a method of making a lock nut having locking characteristics that change a relatively small amount upon extensive or repeated usage;

These and other objects of this invention will become more apparent to those skilled in the art upon reading and understanding the following description of the novel concepts of my invention and of some practical embodiments thereof, and the appended claims.

I have determined that the problem of tolerance range, reusability and low initial holding torque are all solvable by maximizing the flexibility of the nut body as related to the deformation required in the application of the nut to a bolt. By maximum flexibility, it is meant maximum deformation per unit force without exceeding the elastic limits of the material at any point in the nut. Plastic deformation of the nut body, or a portion thereof occurring upon application of the nut to a bolt is a major failure of common lock nuts showing up primarily as excess initial torque and rapid loss of holding torque upon re-application. Lock nuts must have outer configurations that conform to the standard specification for wrenching purposes. Accordingly, lock nut construction must take into account limitations inherent in standard nut shapes such as hexagonal and square. I have determined that fully elastic response of a nut having a standard basic configuration requires elastic flexure of substantially the entire nut body as opposed to localized areas, for example, adjacent the threads. Movement of localized areas adjacent the thread without flexure of the entire nut body results in undesirable plastic deformation of the nut in the very regions where locking forces are developed. Accordingly, the lock nut of this invention is constructed to maximize the flexibility of the entire nut body at least throughout the axial locking portions thereof.

To accomplish the desired maximum flexibility, the lock nut of this invention is deformed into a two axis asymmetry only, so as to ovalize the threaded bore with respect to the nut periphery. The ovalized threaded bore is oriented, with respect to the nut periphery, such that the point of maximum bending moment (which falls 90° from the minor axis of the oval), occurs at a cross section of minimum wall thickness or moment of inertia to thereby provide maximum flexibility of the nut body as a unit. This flexibility permits the nut to deform elastically a maximum amount per unit force and thus accommodate a large range of tolerance variation without exceeding the elastic limit of the nut material at any point.

In this regard it should be pointed out that a hexagonal lock nut exists in the prior art having an ovalized bore that is oriented with respect to the periphery such that a maximum wall thickness or moment of inertia occurs at the point of maximum bending moment. The prior art lock nut is much less flexible than the lock nut of this invention for this reason.

Another important concept of this invention involves the formation of an elliptical or near elliptical bore shape such that substantially no flat threaded surfaces are presented to the cooperating bolt. I have determined that force exerted on opposed corners of the hexagonal nut will produce a smoothly rounded distortion of the bore which can conform to a cooperating bolt much more completely than a flat surface. A greater degree of conformity permits the expanding loading that occurs during the insertion of a bolt to be distributed through a larger area of material thus minimizing the possibility of plastic deformation of the bore threads due to excess loading. Also, I have determined that upon deformation of the near elliptical bore, the bore will tend to recircularize, thus distributing the expanding force over an ever increasing surface area as the force increases.

The advantages of improved flexibility are cumulative in that in addition to the wide range of tolerances acceptable, the lack of plastic deformation, and the low initial torque required to produce adequate reusability, these factors further enhance the reusability by minimizing thread wear due to high initial loading. Furthermore, the locking action is accomplished by purely radial clamping action which is in no way disturbed by the axial force developed when the nut is tightened onto a part. Many existing lock nuts include a bit of axial deformation which contributes greatly to the initial torque but is lost during initial tightening so as not to contribute correspondingly to the holding force.

These novel concepts will be more fully understood from the following description of some preferred embodiments of my invention wherein specific reference is made to the accompanying drawings of which:

Figure 1:
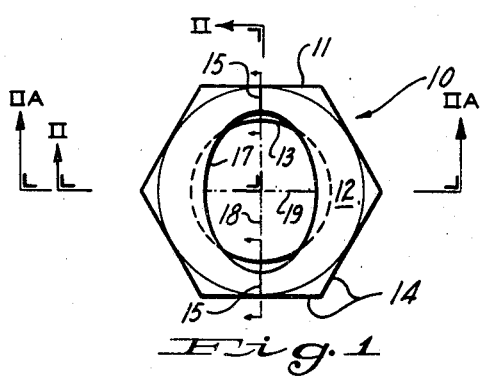
FIGURE 1 is an enlarged top or plan view of a lock nut constructed in accordance with this invention showing the details thereof in somewhat exaggerated form for ease of understanding.
Figure 2:
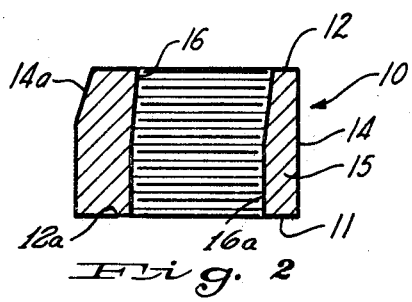
FIGURE 2 is an elevated cross sectional view of the lock nut shown in FIGURE 1 taken along line II—II thereof.

FIGURES 1 and 2 show a self-tensioning fastener or prevailing torque lock nut 10 constructed in accordance with my invention. The lock nut 10 has a body 11 including a substantially uniformly-upwardly-facing or continuous top face 12, a substantially continuous or planar bottom face 12a, and having a centrally located axially extending bolt-receiving portion or threaded bore 13 therethrough. The lock nut 10 further has six lateral or side faces 14 that intersect the top face 12 and define a polygonal or hexagonal periphery in vertical projections. The hexagonal periphery of the facing 14 combined with the threaded bore 13 and the substantially uniformly-upwardly facing top face 12 establish a side wall having a plurality of zones or cross sections 15 of minimum wall thickness and minimum resistance to elastic bending.

The threaded bore 13 is distorted particularly at one axial end portion 16 to a peripherally oval or elliptical configuration 17 as best seen in FIGURE 1. The distortion preferably is gradual along upper length portion 16 of the bore into a lower circular shaped bore portion 16a, as shown in FIGURE 2. The oval configuration 17 has major and minor axes respectively 18 and 19. The major axis 18 is substantially aligned with opposed zones 15 of minimum cross section such that forces applied in the region of the minor axis 19 will result in maximum deflection of the nut body per unit force applied due to the insertion of a bolt. This result is assured by locating the zone 15 at the point of maximum bending moment, i.e., longest moment arm. The bending moment, itself, is maximized by the two axis asymmetrical oval configuration 17 which assures a maximum 90° moment arm within the limits of the standard nut configuration.

Figure 3:
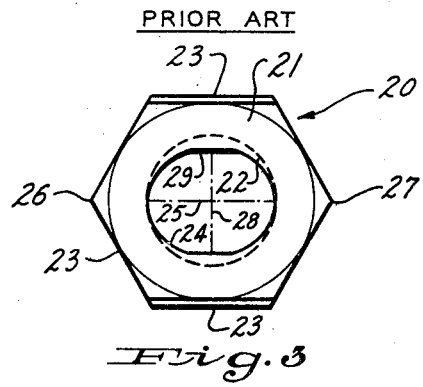
FIGURE 3 is an enlarged top or plan view of a prior art lock nut having the details thereof somewhat exaggerated for ease of understanding.

The lock nut 10 thus far described is to be contrasted with the prior art lock nut 20 as shown in FIGURE 3. The lock nut 20 has a body 21 having a threaded bore 22 therethrough and a plurality of lateral or side faces 23 that define a hexagonal periphery. The threaded bore 22 is distorted or flattened adjacent one axial end portion into an ovalized periphery 24 having a major axis 25 that is oriented in line with a pair of opposed corner portions 26 and 27 of the nut body 21 and a minor axis 28 that is aligned with opposed side faces 23. The maximum bending moment resulting from expanding forces applied in the region of the minor axis 28 will occur at cross section of maximum thickness and maximum moment of inertia, i.e., the cross sections adjacent opposed corners 26 and 27. The comparative result is less flexibility than the lock nut shown in FIGURE 1 and the disadvantages inherent therein as heretofore described. Furthermore, the prior art lock nut 20 is formed by the application of distorting force along two opposed side faces 23 resulting in substantially flat peripheral segments 29 in the region of the minor axis 28. The flat segments 29 tend to concentrate expanding forces at a point rather than over a significant area and thus encourage plastic thread deformation. On the other hand, the lock nut 10 of FIGURE 1 is formed, as hereinafter described, by distorting force applied across opposed corners in alignment with the minor axis 19. Maximum bending and plastic deformation occurs at the minimum wall thickness sections 15 adjacent axis 18, resulting in a squashing of the nut body rather than penetration of displaced metal. The nature of the distortion throughout the relatively thicker section adjacent these corner portions is such that the oval peripheral configuration 17 is more nearly elliptical, or in other words has curved rather than flat segments in the region of the minor axis 19. These curved segments tend to distribute expanding force from a bolt over a sufficient area to minimize or eliminate plastic thread deformation.

Figure 4:
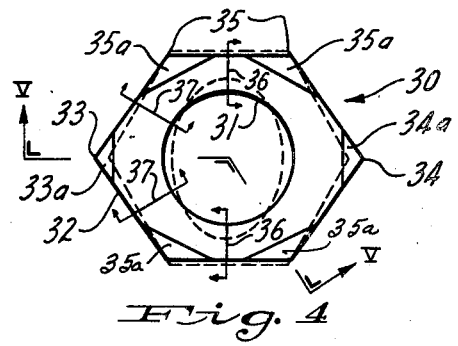
FIGURE 4 is an enlarged top or plan view of an intermediate production stage in the manufacture of lock nuts in accordance with a preferred embodiment of this invention.
Figure 5:
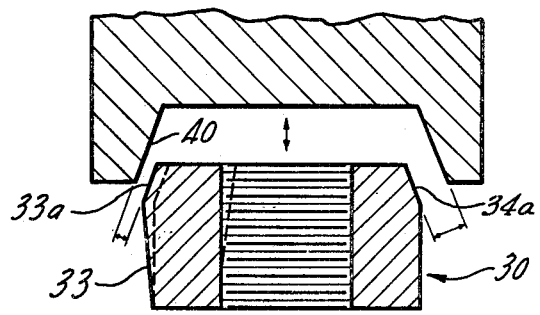
FIGURE 5 is a somewhat schematic elevational cross sectional view of the intermediate stage nut shown in FIGURE 4 and a forming tool for cooperating therewith.

FIGURES 4 and 5 show in full lines a preferred embodiment of this invention in an intermediate stage of production. The final configuration of the nut is shown in broken lines. The intermediate of FIGURES 4 and 5 comprises an intermediate body 30 having a generally cylindrical threaded bore 31 extending therethrough. The body 30 has six side faces that form a slightly elongated, near or substantially hexagonal periphery having four of the six side faces outwardly inclined (see the opposed right and left-hand faces of FIGURE 4).

The axis of side wall elongation passes through two opposed corners 33 and 34. For purposes of manufacturing ease, the upper edges of the corners 33 and 34 as well as the remaining corners 35 are chamfered at an angle of approximately 20° to the vertical to provide upwardly-inwardly sloped faces or surface portions 33a, 34a and 35a respectively. The surface portions 33a and 34a are shown as opposed force application surfaces at corner areas of the sides of the fastener and spaced further laterally from the axis of the threaded bore 31 than the surface portions 35a to establish a pre-set asymmetry having a major axis that is aligned with the opposed corners 33 and 34. As shown in FIGURE 5, a substantially uniform conical tool or die 40 is cooperable with the pre-set asymmetry of the nut intermediate 30 to automatically engage only opposed force receiving surface portions 33a and 34a and exert radial-inward plastic deforming force thereon. Note the relative distance indicated by dimension lines in FIGURE 5. Pressing of the nut intermediate 30 into the tool 40 thus distorts the nut intermediate into its desired final shape as shown by the broken lines in FIGURES 4 and 5. It should be noted that the use of an asymmetrical nut surface distorted by a symmetrical forming tool eliminates the need for orientation of the nut prior to forming. The orientation of the first deformation is controlled strictly by the pre-set asymmetry of the nut intermediate itself.

The use of an initially asymmetrical nut intermediate like that shown in the full lines of FIGURES 4 and 5 permits the final lock nut exterior shape to be truly hexagonal within standard accepted tolerance limits. In addition, the wall thickness at maximum bending zones 36 is slightly less than the wall thickness at intermediate zones 37 to further increase the flexibility of the nut body.

Figure 2A:
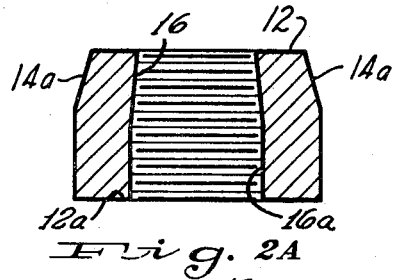
FIGURE 2A is a section in elevation on the scale of FIGURE 2 and taken along the line IIA—IIA of FIGURE 1.
Figure 2B:
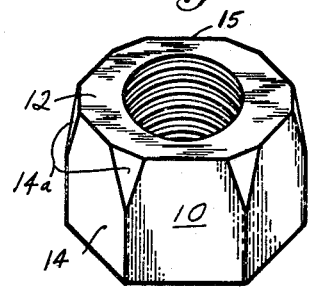
FIGURE 2B is an isometric view in elevation on the scale of FIGURES 1 to 2A, taken in the same direction as the nut of FIGURE 1 and illustrating a form of finished nut of my construction.

It will be noted that in a finished lock nut 10, as shown in FIGURES 1 to 2B, inclusive, I have shown the upper corners of the side faces 14 as connected by inwardly-upwardly sloped planar auxiliary faces 14a that extend from a bottom apex defined by the edges of an adjacent pair of vertical or side planar faces 14 and that widen into the top planar face 12. The faces 14a are important, particularly at opposite sides of the nut (see 33a and 34a of FIGURE 4) which are to be deformed in forming the final configuration or body shape from a preliminary or intermediate form or shape illustrated in FIGURES 4 and 5. The other opposite pair of faces 14a which corresponds to the faces 35a of FIGURE 4 may be employed as holding faces during the deforming operation and in the finished nut give it a uniform appearance effect.

In first forming the intermediate nut body 30, see the preliminary configuration of the full lines of FIGURES 4 and 5, the end or upper area that is to constitute the locking area is provided with an elongated-oblong or asymmetrical outer shape and its threaded bore 31 is provided with a cylindrical shape. In the final forming operation, the outer or surrounding peripheral area of the nut 10 becomes cylindrical or symmetrical in shape, and the inner bore upper area assumes an oblong-elongated or asymmetrical shape. In addition to other advantages previously mentioned, this imparts a memory to the metal of the nut, such that it will flexibly and without plastic deformation, tend to move towards the preliminary shape adjacent its top area when it is tightened or screwed-down on a cooperating bolt. This memory action is greatly facilitated or assured by the fact that the finished nut shape 10 is of lesser thickness 15 or in the direction of its major axis 18. Galling and seizing of the nut is eliminated. Since the flexing of the nut acts through the greatest possible distance of the section of the nut, as represented by the axis 18 of FIGURE 1, forces are substantially equalized throughout its upper rim-like area to produce an equalized locking action.

The crimping operation of FIGURE 5 causes portions of the threads of the bore along opposite sides thereof that are in alignment with the axis of opposed pressing-in force application to move inwardly towards each other and provide a lessened distance therebetween, such that these threads and corresponding portions of the bore are distorted inwardly towards the end of the nut (the upper end of FIGURE 5) adjacent which the forces are applied. At the same time, opposed portions of the threads and the bore that lie along a transverse axis that is normal or perpendicular to the force application are lengthened to provide an increased distance therebetween.

It will thus be appreciated by those skilled in the art that I have devised and developed a new, useful and unobvious lock nut and procedure for making it. While a specific embodiment of my invention has been shown herein for purposes of illustration, it is to be understood that various modifications can be made without departing from the novel concepts disclosed herein.

I claim:

1. A method of making a prevailing torque fastener in the nature of a finished lock nut which comprises, forming a body having substantially planar vertical side faces connected by corner areas to define a polygonal periphery and having top and bottom faces and a top end portion of exteriorly asymmetrical shape about its central axis, forming a symmetrical threaded bore axially-centrally through the body, providing a pair of radially-inwardly and upwardly sloped force-application surfaces contiguous with the top face and aligned with two opposed corner areas of the body, applying opposed radial-inward force to the pair of force-application surfaces and deforming the wall of the nut body along an upper portion thereof and an upper end portion of the threaded bore into an oval shape that has its greatest dimension along an axis at right angles to an axis passing through the pair of force-application surfaces, while deforming the exteriorly asymmetrical shape of the top end portion into an exteriorly symmetrical shape, while maintaining the symmetrical shape of the lower portion of the threaded bore from the bottom face along the lower portion of the body and while radially deforming the upper portion of the threaded bore from the lower symmetrical portion thereof along an axis passing through the pair of force-application surfaces in an upwardly converging taper to the top face.

2. A method as defined in claim 1 wherein, the body is formed into an exteriorly fully symmetrical shape about its central axis by the application of the opposed radial-inward force to the pair of force-application surfaces.

3. A method as defined in claim 1 wherein the upper end portion of the body is provided with a maximum wall thickness between the outer surface thereof and the threaded bore along the axis passing through the pair of opposed force-application surfaces and with a lesser wall thickness along the axis at right angles thereto.

4. A method as defined in claim 1 wherein the radial-inward force is applied upon the pair of force-application surfaces by moving a symmetrical cavity portion of a tool head along the axis of the threaded bore.

5. A method of making a prevailing torque fastener in the nature of a finished lock nut from a body having vertical sides faces connected by corner areas to define a polygonal periphery thereabout and with end portions connected to the side faces which comprises, forming a preliminary nut body that is exteriorly asymmetrical about its central axis, forming a symmetrical threaded bore centrally through the body, and then applying a symmetrical force along the axis of the threaded bore in a radial-inwardly sloped relation to a pair of opposed force-application surfaces of one end portion of the body and deforming the body into a final exteriorly symmetrical shape about its central axis and the threaded bore into a final asymmetrical shape at the one end portion.

6. A method as defined in claim 5 wherein, the preliminary nut body is formed in an oval shape between the side faces, the force is applied to the pair of force-appliaction surfaces at a major lateral axis of its oval shape, and the final asymmetrical shape of the one end portion of the threaded bore is laterally-ovalized along a lateral axis at right angles to the lateral axis of the force-application surfaces.

7. A method as defined in claim 6 wherein, the preliminary body is formed with a maximum wall thickness between the exterior faces and the threaded bore along the minor lateral axis of its oval shape and of minimum wall thickness along a lateral axis at right angles thereto, and the final shape of the one end of the threaded bore is formed with a minimum wall thickness along the lateral axis at right angles to the lateral axis of the force-application surfaces.

References Cited

UNITED STATES PATENTS

| Number | Date | Name | Class |
|---|---|---|---|
| 1,083,217 | 12/1913 | McClellan | 10—86 |
| 1,522,565 | 1/1925 | Whitman | 10—86 |
| 2,337,030 | 12/1943 | Cole | 151—21 |
| 2,464,412 | 3/1949 | Neff | 10—86 |
| 2,816,591 | 12/1957 | Reiner | 10—86 |
| 3,171,459 | 3/1965 | Storch | 151—21 |
| 3,198,230 | 8/1965 | Stover | 151—21 |
| 3,311,146 | 3/1967 | Storch | 151—21 |
| 3,352,342 | 11/1967 | Jacobson | 151—21 |
| 3,354,926 | 11/1967 | Mattick | 151—21 |
| 3,412,772 | 7/1966 | Meyfarth et al. | 151—21 |

CHARLES W. LANHAM, Primary Examiner

E. M. COMBS, Assistant Examiner

UNITED STATES PATENT OFFICE
CERTIFICATE OF CORRECTION

Patent No. 3,496,582      Dated February 24, 1970

Inventor(s) Kenneth L. Johnson

It is certified that error appears in the above-identified patent and that said Letters Patent are hereby corrected as shown below:

Column 1, line 59, correct the spelling of "accept".

Column 7, line 23, claim 5, change "sides" to --side--.

SIGNED AND
SEALED
JUN 3 0 1970

(SEAL)
Attest:

Edward M. Fletcher, Jr.
Attesting Officer

WILLIAM E. SCHUYLER, JR.
Commissioner of Patents